No. 848,773. PATENTED APR. 2, 1907.
F. SCHULZ.
THRUST BEARING.
APPLICATION FILED NOV. 13, 1905.
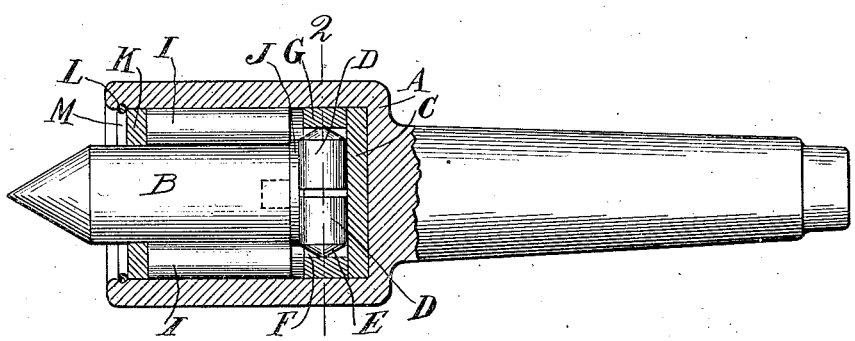
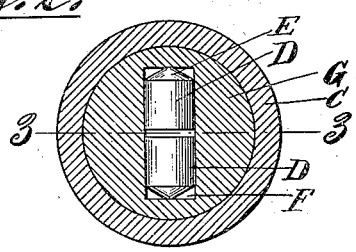
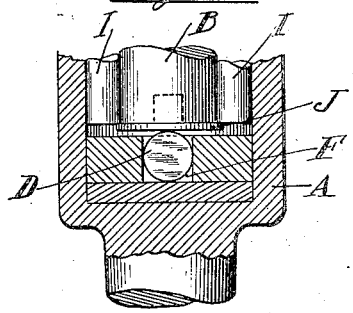
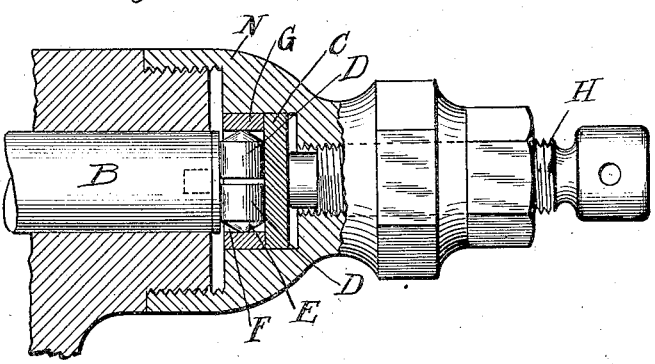
Witnesses
E. F. Wilson
R. A. Fischer
Inventor
By Fritz Schulz
Rudolph Ino. Foss Atty.

# UNITED STATES PATENT OFFICE.

FRITZ SCHULZ, OF CHICAGO, ILLINOIS.

THRUST-BEARING.

No. 848,773.

Specification of Letters Patent.

Patented April 2, 1907.

Application filed November 13, 1905. Serial No. 287,144.

*To all whom it may concern:*

Be it known that I, FRITZ SCHULZ, a citizen of the United States, residing at Chicago, in the county of Cook and State of Illinois, have invented certain new and useful Improvements in Thrust-Bearings; and I do hereby declare the following to be a full, clear, and exact description of the invention, such as will enable others skilled in the art to which it appertains to make and use the same.

My invention relates to a novel construction in a thrust-bearing for lathe-spindles or the like, the object being to provide simple and efficient means for reducing the friction and providing at the same time a bearing having lasting wearing power, and consists in the features of construction and combinations of parts hereinafter fully described and claimed.

In the accompanying drawings, illustrating my invention, Figure 1 is a central longitudinal section, partly in elevation, of a spindle provided with a thrust-bearing constructed in accordance with my invention. Fig. 2 is a transverse section of the same on the line 2 2 of Fig. 1. Fig. 3 is a fragmentary longitudinal section on the line 3 3 of Fig. 2. Fig. 4 is a central longitudinal section, partly in elevation, of an adjustable thrust-bearing for use in metal-spinners' lathes.

Lathe-spindles, and particularly the spindles employed in metal-spinners' lathes, are subjected to relatively heavy end or thrust pressure while rotating at high speed, and the thrust-bearings for the same are therefore very apt to become hot and, in fact, unless continuously and well lubricated and pressure distributed over relatively large area attain very high temperature and rapidly wear out, so that constant repairs become necessary.

The object of my present invention is to provide a thrust-bearing in which the friction is minimized and which is cheap, relatively durable, and easily and quickly repaired at very small cost. To this and other ends I provide in the sleeve or journal A, in which the spindle B is journaled, a plate C, upon which two rollers D rest and run and upon which said rollers the spindle B bears at its inner end. The said rollers D are tapered or rather terminate at one end in a conical point E, which is disposed outwardly, and bear against the end walls of an opening F in the middle of a circular plate G, mounted in said sleeve A and resting upon said plate C. The said rollers D are revolved by the frictional contact of the spindle B therewith and are held outwardly, so that the conical ends of the same bear against the walls of said opening F by means of the centrifugal force imparted. As shown in Fig. 4, the said plate C may be disposed in the path of the end of a set-screw H, by means of which it is adjusted in position to adjust the position of the shaft or spindle B, this being particularly necessary and desirable in a metal-spinner's lathe.

In order to hold the spindle B in place, as shown in Fig. 1, and to further decrease the friction thereof, I surround the same with cylindrical rollers I, the latter being substantially equal in diameter to the width of the annular space between said spindle B and the surrounding sleeve A. The said spindle is provided at its rear end with an annular flange J, between which and a plate K, disposed adjacent the forward end of the sleeve A, said rollers are confined. Said sleeve A is provided internally adjacent its forward end with an annular groove L, in which a split spring-ring M is adapted to be sprung and forms a collar serving to hold said plate K in proper relative position.

It will be noted that the plate G is revolved by said rollers D, and it is therefore necessary and advisable to maintain the chamber in which said plate G rests well lubricated, this being accomplished in any suitable manner.

Attention is called to the fact that repairs can be readily effected by removing the spindle B or in the construction shown in Fig. 4 removing the cup N, which takes the place of said sleeve A, and removing the rollers D, contained therein, and replacing the same, said rollers being mainly subjected to wear. A new plate G may obviously be inserted in the same manner. Said spindle B in the construction shown in Fig. 1 is removed by first removing the split ring M and then withdrawing the spindle, thereby obviously also withdrawing said plate K and rollers I.

I claim as my invention—

1. In a thrust-bearing, the combination with a sleeve having an end wall, and the spindle revoluble in said sleeve, of a plate disposed between the end wall of said sleeve and the end of said spindle and having a central rectangular opening, rollers of greater diameter than the thickness of said plate disposed within said opening and confined between the side walls of the latter by peripheral contact therewith, the axes of said rollers being radially disposed relatively to the axis of said spindle and the outer ends thereof being conical and abutting against the end walls of said opening, said rollers being disposed on opposite sides of the axis of rotation of said spindle and adapted to be revolved by contact with the inner end of the latter to revolve said plate.

2. An antifriction-bearing for a spindle comprising a cup of larger diameter than said spindle, a revoluble plate having an opening disposed between the end wall of said cup and the end of the spindle, rollers of larger diameter than the thickness of said plate loosely disposed in said opening and adapted to receive the thrust pressure on said spindle, there being an annular flange at the inner end of said spindle, a plate disposed adjacent the mouth of said cup and having a central opening for the passage of said spindle, antifriction-rollers disposed around said spindle between said annular flange and said plate, and a split spring-ring disposed in an annular groove in the mouth portion of said cup adapted to hold said last-named plate against removal.

In testimony whereof I have signed my name in presence of two subscribing witnesses.

FRITZ SCHULZ.

Witnesses:
RUDOLPH WM. LOTZ,
E. F. WILSON.